United States Patent [19]

Hanisko

[11] Patent Number: 4,940,107
[45] Date of Patent: Jul. 10, 1990

[54] METHOD AND APPARATUS FOR CONTROLLING A POWER ASSIST STEERING SYSTEM

[75] Inventor: John-Cyril P. Hanisko, Southfield, Mich.

[73] Assignee: TRW Inc., Lyndhurst, Ohio

[21] Appl. No.: 249,369

[22] Filed: Sep. 23, 1988

[51] Int. Cl.⁵ .............................................. B62D 5/04
[52] U.S. Cl. .................................... 180/142; 180/79.1
[58] Field of Search .............. 180/141, 142, 143, 132, 180/79.1; 74/388 PS

[56] References Cited

U.S. PATENT DOCUMENTS

| Re. 32,222 | 8/1986 | Drutchas | 180/79.1 |
|---|---|---|---|
| 3,588,713 | 6/1971 | Yareck | 328/160 |
| 4,204,143 | 5/1980 | Coleman | 318/341 |
| 4,498,138 | 2/1985 | Moore | 364/483 |
| 4,514,666 | 4/1985 | Suzuki | 318/293 |
| 4,538,698 | 9/1985 | Hashimoto et al. | 180/79.1 |
| 4,557,342 | 12/1985 | Drutchas | 180/132 |
| 4,562,896 | 1/1986 | Morishita et al. | 180/142 |
| 4,580,649 | 4/1986 | Ohe et al. | 180/79.1 |
| 4,598,787 | 7/1986 | Drutchas | 180/79.1 |
| 4,624,336 | 11/1986 | Eddy | 180/142 |

Primary Examiner—Charles A. Marmor
Assistant Examiner—Richard Camby
Attorney, Agent, or Firm—Tarolli, Sundheim & Covell

[57] ABSTRACT

A method and apparatus for controlling a vehicle power assist steering system. The apparatus includes a control circuit for controlling the power assist as a function of sensed vehicle speed and applied steering torque. The control circuit includes a circuit for providing a pulse-width modulated signal having a duty cycle that varies as a function of vehicle speed. the control circuit further includes a torque signal amplifier having a gain that is controlled by the pulse-width modulated signal. A filter network averages the value of the output of the torque signal amplifier. The average value is a power assist control signal used to control the power assist.

11 Claims, 3 Drawing Sheets

4,940,107

METHOD AND APPARATUS FOR CONTROLLING A POWER ASSIST STEERING SYSTEM

TECHNICAL FIELD

The present invention relates to a vehicle, power assist, steering system and is particularly directed to a method and apparatus for controlling a vehicle, power assist, steering system.

BACKGROUND

Electrically controlled, vehicle, power assist, steering systems are well know in the art. In such systems, power assist typically varies as a function of applied steering torque and vehicle speed so as to maintain a desired steering feel. If vehicle speed is constant, an increase in applied steering torque results in an increase in power assist. If vehicle speed varies, power assist varies inversely in response thereto. Such systems are referred to in the art as "speed foldback control systems."

An example of an apparatus for controlling a power assist steering system is disclosed in U.S. Reissue Pat. No. Re 32,222 to Drutchas, which is assigned to the assignee of the present application. The Drutchas reissue patent discloses a steering system in which power assist is controlled in response to sensed steering torque and another input signal, such as sensed vehicle speed. A torque sensor provides an electrical signal indicative of applied steering torque. A steering wheel is connected to a rack member through a torsion bar. Upon application of steering torque, the torsion bar twists and a sensor, operatively coupled across the torsion bar, outputs a signal indicative of the amount of such twist. Taking into account the structural characteristics of the torsion bar, the amount of twist is indicative of the applied steering torque. The signal indicative of the applied steering torque and a signal indicative of sensed vehicle speed are connected to an electronic control unit. The electronic control unit controls power assist as a function of the sensed steering torque and sensed vehicle speed.

Another example of an apparatus for controlling a power steering system is disclosed in U.S. Pat. No. 4,538,698. The '698 patent discloses a steering system having an apparatus which controls power assist in response to applied steering torque and sensed vehicle speed. The apparatus includes a multiplier. The signal indicative of steering torque is connected to an input of the multiplier. A function generator connected to the speed sensor provides a signal to the multiplier having a value that is functionally related to vehicle speed. When the vehicle speed is within a particular speed range, power assist varies inversely in response to variations in the vehicle speed. The multiplier multiplies the value of the torque signal by the value of the signal output from the function generator. The output of the multiplier is coupled to a pulse-width modulating circuit through a differential amplifier. The output of the pulse-width modulating circuit is used to control a power assist motor.

Still another example of an apparatus for controlling a power assist steering system is disclosed in U.S. Pat. No. 4,562,896. The '896 patent is directed to an apparatus having an electrical circuit which controls power assist in response to vehicle speed. The circuit includes a speed sensor connected to a frequency/voltage ("F/V") converter. The output of the F/V converter is a DC voltage having a value that varies inversely in response to sensed vehicle speed. An error amplifying circuit compares the output voltage from the F/V converter against an electrical signal indicative of current flowing through a solenoid control valve and generates a corresponding error signal therefrom. The position of the solenoid valve is indicative of the amount of power assist. An oscillator circuit generates a triangular shaped, electrical signal at a reference frequency. The output of the error amplifying circuit and the output of the oscillator circuit are connected to a comparator. The output of the comparator is a pulse-width modulated signal having a duty cycle that varies as a function of vehicle speed. The pulse-width modulated signal is connected to a solenoid drive circuit. The control arrangement is adapted so that power assist decreases as the vehicle speed increases.

Known speed foldback control systems for power assist steering systems, such as those shown in the '698 patent and the '896 patent, include complex circuitry. The complexity of the circuitry increases the overall number of electrical components which, in turn, adds to the total cost of manufacture and effects operating reliability of the circuitry. Furthermore, some known control circuits require use of a substantial number of trims, i.e., potentiometers, which must be adjusted during the manufacturing process. Due to the wide range of temperatures in which a vehicle must operate, stability in operation of the power assist control system is difficult when certain components, such as potentiometers, are used.

SUMMARY OF THE INVENTION

The present invention provides a new and improved method and apparatus for reducing power assist in a steering system as sensed vehicle speed increases. In accordance with the present invention, a pulse-width modulated signal is provided having a duty cycle that varies as a function of one of sensed vehicle speed or applied steering torque. A signal indicative of the other of vehicle speed or applied steering torque is connected to a variable gain amplifier. The gain of the amplifier is controlled by the pulse-width modulated signal. The output of the amplifier is filtered so as to provide a power assist control signal having an averaged value of the amplified torque signal. The control apparatus further includes means for providing vehicle power assist steering in response to the power assist control signal.

In accordance with the present invention, an apparatus for controlling a vehicle power assist steering system comprises means for providing a pulse-width modulated signal having a duty cycle that varies as a function of one of vehicle speed or applied steering torque. The apparatus further comprises a variable gain amplifier for amplifying an electrical signal having a characteristic indicative of the other of vehicle speed or applied steering torque. Means are provided for controlling the gain of the amplifier as a function of the duty cycle of the pulse-width modulated signal. The apparatus further comprises means for averaging the output of the amplifier and for providing a power assist control signal having a value indicative of the averaged amplified signal, and means for controlling the vehicle power assist steering in response to the power assist control signal.

Also, in accordance with the present invention, a method for controlling a vehicle power assist steering system is provided, comprising the steps of (a) providing a pulse-width modulated signal having a duty cycle that varies as a function of one of vehicle speed or applied steering torque, (b) amplifying an electrical signal having a characteristic indicative of the other of vehicle speed or applied steering torque, (c) controlling the amplification of the electrical signal indicative of applied steering torque as a function of the duty cycle of the pulse-width modulated signal, (d) averaging the value of the amplified signal, (e) providing a power assist control signal having a value indicative of the averaged amplified signal, and controlling vehicle power assist in response to the power assist control signal.

In accordance with a preferred embodiment of the present invention, the apparatus for controlling the vehicle power assist steering system includes a triangular wave generator that outputs a triangular shaped, electrical signal. The triangular wave generator is connected to one input of a comparator. A vehicle speed sensor provides a DC output signal having a value indicative of vehicle speed. The DC output signal of the speed sensor is connected to a second input of the comparator. The comparator provides a pulse-width modulated signal having a frequency equal to the frequency of the triangular shaped, electrical signal and a duty cycle that varies as a function of the value of the DC output signal from the speed sensor.

A torque sensor provides a DC output signal having a value indicative of applied steering torque. The DC output signal of the torque sensor is connected to an input of a variable gain amplifier. The gain of the amplifier is modulated by the pulse-width modulated signal from the comparator. The output of the amplifier is connected to a filter network which averages the value of the amplified torque signal. The filtered signal is a power assist control signal and is connected a pulse-width modulator circuit. The pulse-width modulator circuit controls a drive circuit which, in turn, controls current through an electric assist motor in response to the power assist control signal. The comparator and the variable gain amplifier are adapted so as to reduce power assist as vehicle speed increases.

A control apparatus made in accordance with the present invention provides a control circuit having a relatively small number of parts and no adjustable components such as potentiometers. Such a control circuit is cost-efficient, both from a component standpoint and ease of manufacture, temperature stable, and reliable.

BRIEF DESCRIPTION OF THE DRAWINGS

The foregoing and other features and advantages of the present invention will become apparent to one skilled in the art to which the present invention relates from reading the following detailed description in conjunction with the accompanying drawings, wherein.

DETAILED DESCRIPTION OF THE INVENTION

Figure 1:
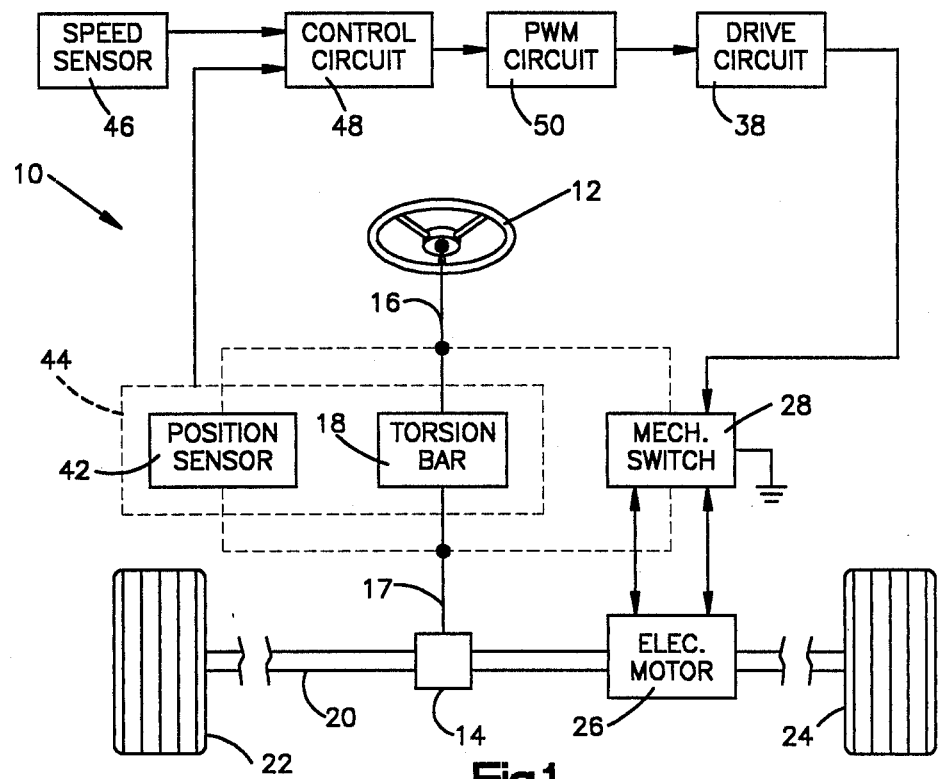
FIG. 1 is a schematic block diagram illustrating a power assist steering system incorporating the present invention.

Referring to FIG. 1, a vehicle power assist steering assembly 10 includes a steering wheel 12 mechanically coupled to a pinion gear 14 through an input shaft 16 and a pinion shaft 17. The input shaft 16 and the pinion shaft 17 are resiliently coupled together by a torsion bar 18. The pinion gear 14 meshingly engages rack teeth disposed on a steering member 20. The steering member 20 is connected to steerable wheels 22, 24 of the vehicle in a known manner.

Rotation of the steering wheel 12 causes steering movement of the steerable wheels 22, 24. When steering torque is applied to the steering wheel 12 and the wheels 22, 24 are subject to resistance to steering movement, relative rotation occurs between the input shaft 16 and the pinion shaft 17. The amount of relative rotation is a function of the structural characteristics of the torsion bar 18.

An electric assist motor 26 circumscribes the steering member 20 and is drivingly connected thereto through a ball-nut drive assembly (not shown). A power assist steering system having such an electric assist motor and ball-nut drive assembly is fully described in U.S. Pat. No. 4,415,054 to Drutchas, now U.S. reissue Pat. No. Re 32,222, which is assigned to the assignee of the present application and is hereby fully incorporated herein by reference.

Figure 2:
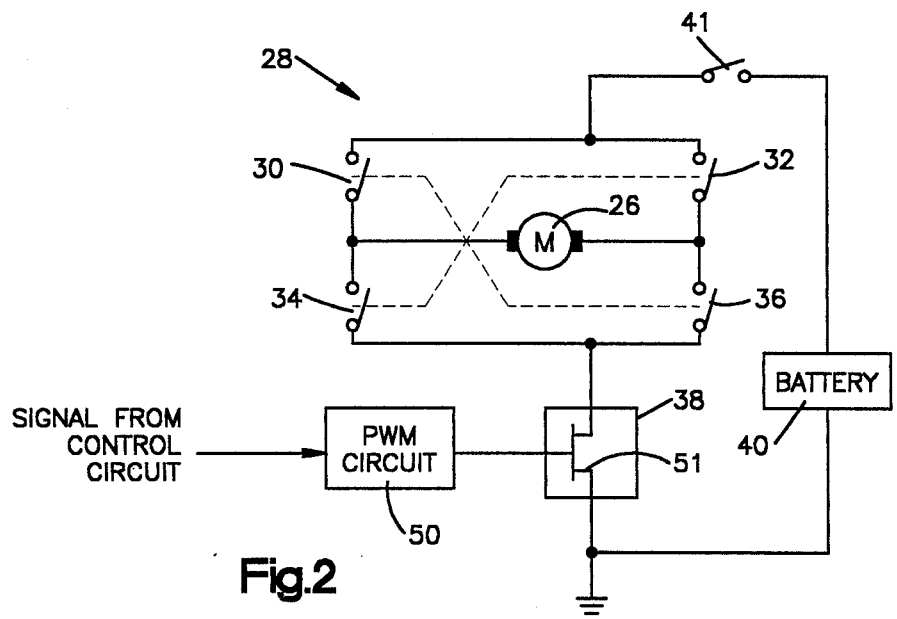
FIG. 2 is a schematic block diagram of a portion of the power assist steering system of FIG. 1.

Referring to FIGS. 1 and 2, a mechanical switch assembly 28 is connected to the input shaft 16 and the pinion shaft 17 across the torsion bar 18 The assembly 28 includes four mechanically actuatable switches 30, 32, 34, and 36 connected in an "H" network. The four switches are normally open when no torque is applied to the vehicle steering wheel 12. The assembly 28 is adapted so that the switches close in pairs upon application of a predetermined amount of steering torque to the steering wheel 12. If steering torque greater than the predetermined amount is applied in one direction, switches 30, 36 close. If steering torque greater than the predetermined amount is applied in the other direction, switches 32, 34 close.

The junction of switches 30, 34 is connected to one terminal of the electric assist motor 26 and the junction of switches 32, 36 is connected to the other terminal of the electric assist motor 26. The junction of switches 34, 36 is connected to a drive circuit 38. The junction of switches 30, 32 is connected to one potential of a source of electrical energy 40 through the vehicle ignition switch 41. Such a mechanical switch assembly 28 is fully disclosed in U.S. Pat. No. 4,598,787 to Drutchas which is assigned to the assignee of the present invention and is hereby fully incorporated herein by reference.

A position sensor 42 is connected to the input shaft 16 and the pinion shaft 17 across the torsion bar 18 and provides an electrical signal having a DC voltage value that varies as a function of the amount of relative rotation between the input shaft 16 and the pinion pinion shaft 17. The position sensor 42 in combination with the torsion bar 18 form a torque sensor 44. The value of the output signal from the torque sensor 44 ("torque signal") varies as a function of the steering torque applied to the vehicle steering wheel 12. A speed sensor 46 provides an output signal ("speed signal") having a DC voltage value that varies as a function of the vehicle speed.

The torque signal and the speed signal are connected to a control circuit 48. In response to the torque signal and the speed signal, the control circuit 48 provides a power assist control signal which is connected to a pulse-width modulator ("PWM") circuit 50. The PWM circuit 50 provides a pulse-width modulated output signal to the drive circuit 38.

The power assist provided varies as a function of the current flow through the electric assist motor 26 which is, in turn, a function of the duty cycle of the pulse-width modulated signal. The drive circuit 38 includes a solid state switching device 51, such as a field-effect transistor ("FET"). When the FET 51 is ON, an electrical current path is present between the junction of switches 34, 36 and the other potential of the source of electrical energy 40. Current through the motor is controlled by the ON time of the FET 51.

Figure 3:
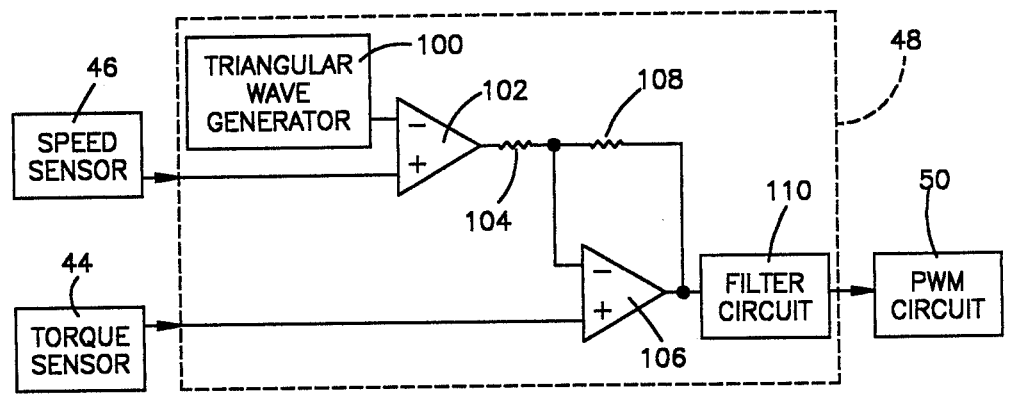
FIG. 3 is a schematic block diagram illustrating a control circuit made in accordance with the present invention for use in the power assist steering system of FIG. 1.

Referring to FIG. 3, the control circuit 48, in accordance with the present invention, includes a triangular wave generator 100 that provides a triangular shaped, electrical signal The output of the triangular wave generator 100 is connected to the inverting input of a comparator 102. The signal indicative of vehicle speed from sensor 46 is connected to the noninverting input of the comparator 102. The comparator 102 outputs a pulse-width modulated signal having a duty cycle that varies as a function of the vehicle speed.

The output of the comparator 102 is connected through a resistor 104 to the inverting input of an amplifier 106. The torque signal from the torque sensor 44 is connected to the noninverting input of the amplifier 106. The output of the amplifier 106 is connected back to its inverting terminal through a resistor 108.

The output of the amplifier 106 is equal to the value of the torque signal from sensor 44 times the gain of the amplifier 106. The gain of the amplifier 106 is controlled as a function of the values of resistors 104, 108 and the output of the comparator 102. The comparator 102 is an open collector type well known in the art. Since the output of the comparator 102 is a pulse-width modulated signal having a duty cycle that varies as a function of the vehicle speed, the gain of the amplifier 106 is modulated as a function of vehicle speed. When the output of comparator 102 is at ground potential, the gain "A" amplifier 106 is:

$$A = 1 + \frac{R(108)}{R(104)} \quad (1)$$

When the output of comparator 102 is not at ground potential, the gain A of amplifier 106 is:

$$A = 1 \quad (2)$$

If at time O the output of comparator 102 is not at ground potential, at time $t_1$ the output of comparator 102 goes to ground potential, and at time $t_2$ the output of comparator 102 switches so that is not at ground potential, the gain of amplifier 106 over time A(t) can be expressed as:

$$A(t) = 1 + \left[\frac{R(108)}{R(104)}\right] \cdot \left[\frac{t_2 - t_1}{t_2}\right] + \text{Ripple Terms} \quad (3)$$

Equation (3) can be reduced as follows:

$$A(t) = 1 + \frac{R(108)}{R(104)} - \frac{R(108)}{R(104)} \cdot \left[\frac{t_1}{t_2}\right] + \text{Ripple Terms}$$

$$= 1 + \frac{R(108)}{R(104)} - \frac{R(108)}{R(104)} \cdot \lambda \text{ Ripple Terms} \quad (4)$$

$$\text{where } \lambda = \frac{t_1}{t_2} \quad (5)$$

The output of the amplifier 106 is connected to a filter circuit 110. The output of the filter circuit 110 is a DC signal having a value equal to the average value of the output of amplifier 106. The time average value of the gain A is:

$$A = 1 + \frac{R(108)}{R(104)} - \frac{R(108)}{R(104)} \cdot \lambda \quad (6)$$

The output of the filter circuit 110 is connected to the PWM circuit 50 and is referred to as the power assist control signal.

Figure 4:
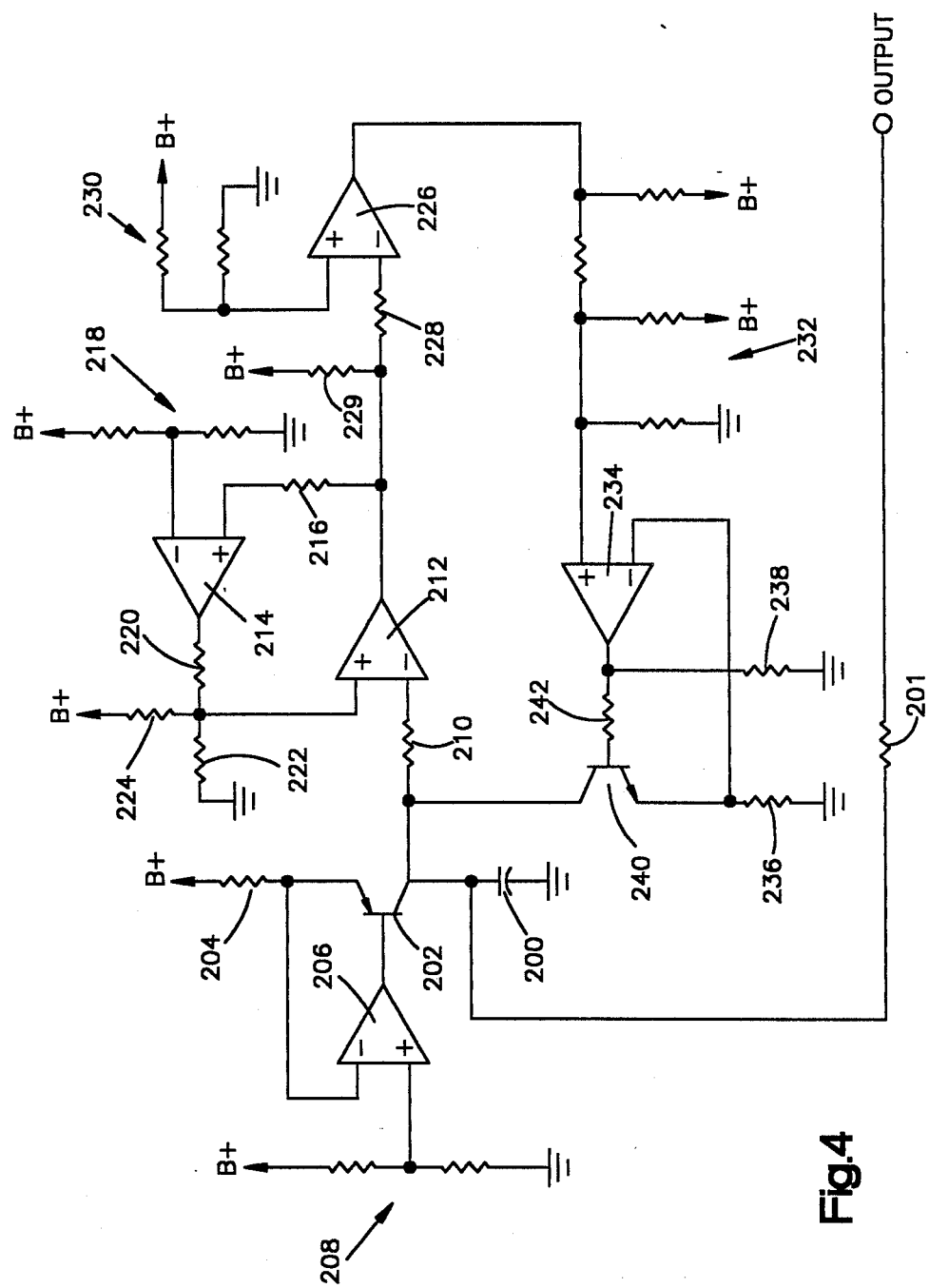
FIG. 4 is a detailed schematic diagram illustrating the triangular wave generator of the control circuit of FIG. 3.

Referring to FIG. 4, the triangular wave generator 100 includes a capacitor 200 having one terminal connected to electrical ground, and a second terminal connected to charging and discharging circuitry. The second terminal of the capacitor 200 is connected to the output of the generator 100 through a resistor 201. The repeated charging and discharging of the capacitor 200 provides the triangular shaped, electrical signal.

The second terminal of the capacitor 200 is connected to the collector of a transistor 202. The emitter of transistor 202 is connected through a pull-up resistor 204 to a positive potential B+ of the source of electrical energy 40. The emitter of the transistor 202 is further connected to the inverting terminal of operational amplifier ("Op Amp") 206. The noninverting terminal of Op Amp 206 is connected to a voltage reference established by a voltage divider network 208 connected across the source of electrical energy 40. The output of the Op Amp 206 is connected to the base of the transistor 202.

The second terminal of the capacitor 200 is further connected to the inverting terminal of a comparator 212 through a resistor 210. The output of the comparator 212 is connected to the noninverting terminal of a comparator 214 through a resistor 216. The inverting terminal of the comparator 214 is connected to a voltage reference provided by a voltage divider network 218 connected across the source of electrical energy 40.

The output of comparator 214 is connected to series connected resistors 220, 222, the second terminal of resistor 222 being connected to electrical ground. The junction between the resistors 220, 222 is connected to the positive potential B+ of the source of electrical energy 40 through a resistor 224 and to the noninverting terminal of the comparator 212.

The output of the comparator 212 is further connected to the inverting input of a comparator 226 through a resistor 228. The output of comparator 212 is connected to the positive potential B+ of the source of electrical energy 40 through resistor 229. The noninverting terminal of the comparator 226 is connected to a reference voltage established by a voltage divider network 230 connected across the source of electrical energy 40.

The output of the comparator 226 is connected to the noninverting input of an operational amplifier ("Op Amp") 234 through a resistor network 232. The inverting terminal of the Op Amp 234 is connected to electrical ground through a resistor 236. The output of the Op Amp 234 is connected to electrical ground through a resistor 238.

The output of the Op Amp 234 is further connected to the base of a transistor 240 through a resistor 242. The emitter of transistor 240 is connected to the junction between the inverting terminal of the Op Amp 234 and the resistor 236. The collector of the transistor 240 is connected to the second terminal of the capacitor 200.

To better understand the operation of the triangular wave generator 100 assume initially that the capacitor 200 is discharged sufficiently to insure that the voltage across the capacitor 200 is less than the voltage value present at the noninverting input of comparator 212 so that the output of the comparator 212 is a logic HIGH, the output of the comparator 226 is a logic LOW, and the output of the comparator 214 is a logic HIGH.

The voltage established at the noninverting input of the comparator 212 is one of two possible values. The voltage at the noninverting input of comparator 212 controls the maximum and minimum values of the voltage developed across the capacitor 200 which, in turn, is the maximum and minimum voltage of the triangular shaped, electrical signal provided by the generator 100. When the value of the voltage present at the noninverting input of comparator 214 is greater than the value of the reference voltage present at the inverting input of comparator 214, the maximum voltage ("$V_H$") is present at the noninverting input of comparator 212. When the value of the voltage present at the noninverting input of comparator 214 is less than the value of the reference voltage present at the inverting input of comparator 214, the minimum voltage ("$V_L$") is present at the noninverting input of comparator 212. The maximum voltage value $V_H$ and the minimum voltage value $V_L$ are also the maximum and minimum values of the triangular shaped wave. The maximum value of the triangular shaped signal is:

$$V_H = \frac{(B+)R(222)}{R(222) + R(224)} \quad (7)$$

The minimum value of the triangular shape signal is:

$$V_L = (B+) \cdot \left[ \left[ \frac{R(222) R(220)}{R(222) + R(220)} \right] \div \left[ R(224) + \left[ \frac{R(222) R(220)}{R(222) + R(220)} \right] \right] \right] \quad (8)$$

The Op Amp 206, transistor 202, and resistor 204 form a constant current source for the purpose of providing a constant charging current for capacitor 200. The Op Amp 234, transistor 240, and resistor 236 provide a switchable, constant current sink for the purpose of discharging the capacitor 100. When the output of comparator 226 is not at ground potential, the sink current is at its maximum, constant value. When the output of comparator 226 is at ground potential, the sink current is at its minimum, constant value. The source current value falls between the maximum and minimum sink current values so that a triangular shaped wave is present across the capacitor 200. For example, the values of resistors 208 and 204 can be selected to provide a source current value of one milliamp. The resistors 236, 238, 242 can be selected to provide current sinks of one-half (½) milliamp and one and one-half (1½) milliamp. The current source is continuously ON and the current sink is continuously ON and switchable between two values. The result is a charge current of one-half (½) milliamp and a discharge current of one-half (½) milliamp of capacitor 200.

To better understand the operation of the triangular wave generator, assume the $V_L$ is present at the noninverting input of comparator 212 and that the charge on capacitor 200 is greater than $V_L$. The output of comparator 212 would be at ground potential and the output of comparator 226 would be pulled up to a logic HIGH. The Op Amp 234 would switch the current sink to its maximum value to discharge the capacitor. Once the capacitor 200 is discharged to a value equal to (or slightly less than) $V_L$, comparators 212, 226 switch resulting in Op Amp 234 to switch to the minimum current sink. As a result, the capacitor 200 begins to charge. When comparator 214 switches as a result of comparator 212 switching, voltage $V_H$ is present at the noninverting input of comparator 212. The capacitor 200 continues to charge until the voltage across the capacitor 200 reaches a value equal to (or slightly greater than) $V_H$.

When the output ("$V_S$") of the speed sensor is a value between $V_H$ and $V_L$, the output of the comparator 104 is a pulse-width modulated signal having a duty cycle that varies as a function of the value $V_S$. The pulse-width modulated output signal from the comparator 102 is connected through the resistor 104 to the inverting terminal of the amplifier 106. The torque signal, ("$V_T$"), is connected to the noninverting input of the amplifier 106. The resistor 108 is connected between the output of the amplifier 106 and its inverting input The output of the amplifier 106 is represented by a voltage signal $V_O$. To one skilled in the art, it is apparent that the torque signal $V_T$ is amplified to produce the output signal $V_O$.

The gain of the amplifier 106, designated by $V_O/V_T$, varies as a function of the resistors 104, 108 and the output signal from the comparator 102. If the speed signal $V_S$ is less than $V_L$, then the gain of the amplifier 106 is defined as:

$$\frac{V_O}{V_T} = 1 + \frac{R(108)}{R(104)} \quad (9)$$

If $V_S$ is greater than $V_H$, then the gain of the amplifier 106 is defined as:

$$\frac{V_O}{V_T} = 1 \quad (10)$$

If $V_S$ is between $V_L$ and $V_H$, then the gain of the amplifier 106 is defined as:

$$\frac{V_O}{V_T} = 1 + \frac{R(108)}{R(104)} \cdot \left[ \frac{V_H - V_S}{V_H - V_L} \right] \quad (11)$$

Figure 5:
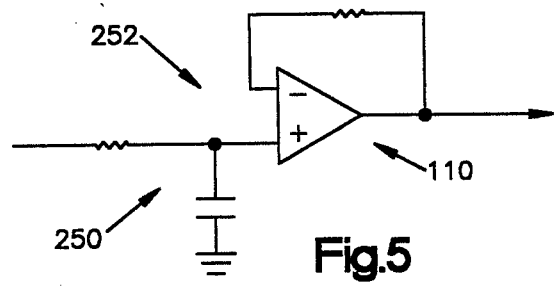
FIG. 5 is a detailed schematic diagram illustrating the filter circuit of the control circuit of FIG. 3.

The output of the amplifier 106 is filtered by the filter network 110. Referring to FIG. 5, the filter 110 includes a resistor/capacitor network 250 connected to the output of amplifier 106 and to electrical ground. A unity gain amplifier 252 is connected to the resistor/capacitor junction of network 250 and provides the output signal for the control circuit 48. The output of the control circuit 48 is an average value of the output signal of the amplifier 106. The average value is the power assist control signal for controlling the power assist to be delivered. The output of the filter network 110 is connected to the PWM circuit 50.

The average value at the output of the filter network 110 varies inversely with the speed signal $V_S$. Therefore, as vehicle speed increases, the power assist provided decreases, and as vehicle speed decreases, the power assist provided increases. The result is a speed fold back control system for maintaining a desired steering feel.

Figure 6:
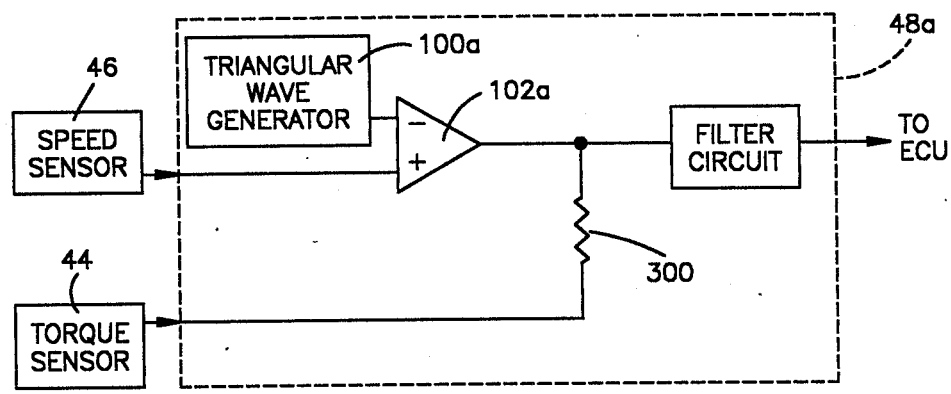
FIG. 6 is a schematic diagram illustrating another embodiment of a control circuit made in accordance with the present invention.

FIG. 6 discloses another embodiment of the present invention. Similar numerals to those used in FIG. 3 have been utilized to designate similar components with the suffix letter "a" added. A control circuit 48a (FIG. 6) includes a triangular wave generator 100a which provides a triangular electrical signal The output of the generator 100a is connected to one input of a comparator 102a. A signal indicative of vehicle speed is connected to the other input of the comparator 102a. The comparator 102a provides a pulse-width modulated signal having a duty cycle that varies as a function of the vehicle speed.

The output of the comparator 102a is connected through a resistor 300 to a signal indicative of the applied steering torque. The comparator 102a is an open-collector type well known in the art. The amplitude of the pulse-width modulated signal is controlled by the value of the torque signal. The output of the comparator 102a is connected to a filter network 110a. The output of the filter network 110a is the output of the control circuit 48a which is connected to the PWM circuit as described above with regard to the first embodiment The output of the filter network 110a is a power assist control signal for controlling the amount of power assist provided by the vehicle steering system.

This invention has been described with reference to preferred embodiments. Modifications and alterations may occur to others upon reading and understanding the specification. For example, the invention has been described in a power assist steering system having an electric assist motor. The power assist control signal provided by the present invention is also applicable to electrically controlled, hydraulic, power assist steering systems. Also, the preferred embodiment of the invention has been described as connecting the signal from the control circuit 48 to a pulse-width modulator circuit 50 that, in turn, pulse width modulates an FET 51 to control motor current. It will be appreciated that the output from the control circuit 48 can be used to control a linear drive circuit which would, in turn, control motor current. It is my intention to include all such modifications and alterations insofar as they come within the scope of the appended claims.

Having described a specific preferred embodiment of the invention, the following is claimed:

1. An apparatus for controlling a vehicle power assist steering system, comprising:
    means for providing a pulse-width modulated signal having a duty cycle that varies as a function of one of vehicle speed or applied steering torque;
    a variable gain amplifier for amplifying an electrical signal having a characteristic indicative of the other of vehicle speed or applied steering torque;
    means for controlling the gain of said amplifier as a function of said duty cycle of said pulse-width modulated signal;
    means for averaging the output of the amplifier and for providing a power assist control signal having a value indicative of the averaged amplified signal; and
    means for controlling the vehicle power assist steering in response to the power assist control signal.

2. The apparatus of claim 1 wherein said duty cycle of said pulse-width modulated signal varies as a function of vehicle speed and further including means for reducing the amplifier gain in response to the duty cycle indicating increasing vehicle speed.

3. The apparatus of claim 1 wherein said duty cycle of said pulse-width modulated signal varies as a function of vehicle speed and wherein said means for providing a pulse-width modulated signal includes a triangular wave generator means for providing an electrical signal having an amplitude characteristic that varies in a triangular shape over time, and comparator means, the output of said triangular wave generator means being coupled to one input of said comparator means and a signal indicative of the vehicle speed being coupled to the other input of said comparator means, the output of said comparator means providing said pulse-width modulated signal having a duty cycle that varies as a function of the amplitude of the vehicle speed signal.

4. The apparatus of claim 1 wherein said averaging means includes a resistor having one terminal connected in series to one terminal of a capacitor, the output of said variable gain amplifier being connected to the other terminal of said resistor, the other terminal of said capacitor being coupled to electrical ground, the junction between said resistor and said capacitor being the power assist control signal.

5. An apparatus for controlling a vehicle power assist steering system, comprising:
    means for providing a pulse-width modulated signal having a duty cycle that varies as a function of vehicle speed;
    a variable gain amplifier for amplifying a signal indicative of applied steering torque, the gain of said amplifier being controlled in response to said duty cycle of said pulse-width modulated signal such that the gain varies inversely relative to the vehicle speed; and
    means for providing a power assist control signal responsive to the output of said variable gain amplifier for controlling power assist steering of the vehicle in response thereto.

6. A method for controlling a vehicle power assist steering system, comprising the steps of:
    (a) providing a pulse-width modulated signal having a duty cycle that varies as a function of one of vehicle speed or applied steering torque;

(b) amplifying an electrical signal having a characteristic indicative of the other of vehicle speed or applied steering torque;

(c) controlling the amplification of the electrical signal as a function of the duty cycle of the pulse-width modulated signal;

(d) averaging the amplified electrical signal and providing a power assist control signal having a value indicative of the averaged amplified signal; and (e) controlling vehicle power assist in response to the power assist control signal.

7. The method of claim 6 wherein the step of providing a pulse-width modulated signal varies the duty cycle as a function of vehicle speed and wherein the step of controlling amplification of the electrical signal includes the steps of decreasing amplification in response to the duty cycle of the pulse-width modulated signal indicating increasing vehicle speed.

8. An apparatus for controlling a vehicle power assist steering system, comprising:

triangular wave generator means for providing an electrical signal having an amplitude that varies in a triangular shape over time;

comparator means, the output of said triangle generator means being coupled to a first input of said comparator;

speed sensor means for providing a signal having an amplitude that varies in response to sensed vehicle speed, said speed sensor means being connected to a second input of said comparator, said comparator means providing a pulse-width modulated signal having a duty cycle which varies as a function of the vehicle speed;

torque sensing means for providing an electrical signal having a value that varies as a function of applied steering torque;

a variable gain amplifier, said signal indicative of the applied steering torque being connected to said variable gain amplifier, said variable gain amplifier including means to vary the amplifier gain in response to duty cycle of the pulse-width modulated signal; and filter means connected to the output of said variable gain amplifier for providing a power assist control signal having an amplitude that varies as a function of the signal provided by variable gain amplifier.

9. An apparatus for providing a power assist control signal in an electrically controlled power assist steering system, said apparatus comprising:

means for providing a pulse-width modulated signal having a duty cycle that varies as a function of one of vehicle speed or applied steering torque;

means for controlling the amplitude of said pulse-width modulated control signal as a function of the other of vehicle speed or applied steering torque; and means for averaging the value of the pulse-width modulated signal, the averaged value being said power assist control signal.

10. The apparatus of claim 9 wherein said providing means includes:

speed sensing means for providing a signal having a DC voltage value indicative of sensed vehicle speed;

triangular wave generating means for providing a triangular shaped electrical signal; and comparator means having a first input connected to the speed sensing means and a second input connected to the triangular wave generating means, said comparator means providing said pulse-width modulated signal.

11. The apparatus of claim 10 wherein said means for controlling the amplitude includes torque sensing means for providing a DC voltage value indicative of applied steering torque, a resistor connecting the torque signal to the output of said comparator means, and wherein said comparator means includes an open collector comparator, the amplitude of said pulse-width modulated signal being controlled by the value of the torque signal.

* * * * *